(12) United States Patent
Chang

(10) Patent No.: US 8,915,658 B2
(45) Date of Patent: Dec. 23, 2014

(54) OPTICAL MOVER WITH FUNCTIONS OF NANOMETER FINE ADJUSTMENT AND MICROMETER COARSE ADJUSTMENT

(71) Applicant: Sie-Poon Chang, Taipei Hsien (TW)

(72) Inventor: Sie-Poon Chang, Taipei Hsien (TW)

( * ) Notice: Subject to any disclaimer, the term of this patent is extended or adjusted under 35 U.S.C. 154(b) by 75 days.

(21) Appl. No.: 13/736,958

(22) Filed: Jan. 9, 2013

(65) Prior Publication Data

US 2014/0193118 A1 Jul. 10, 2014

(51) Int. Cl.
G02B 6/255 (2006.01)
G02B 6/42 (2006.01)

(52) U.S. Cl.
CPC ................................ *G02B 6/42* (2013.01)
USPC .............................................. 385/97; 385/52

(58) Field of Classification Search
None
See application file for complete search history.

(56) References Cited

U.S. PATENT DOCUMENTS 7,817,890 B2 * 10/2010 Chang et al. .................... 385/52

* cited by examiner

*Primary Examiner* — Ryan Lepisto

(57) ABSTRACT

An optical mover with functions of nanometer fine adjustment and micrometer coarse adjustment is mainly used to align two optical elements for connecting two optical elements, such as connection of two optical fibers, connection of one optical fiber with a photo diode, or connection of one optical fiber and one optical waveguide. In using, one optical element is placed upon the supporting seat for fine position adjustment, and another optical element is fixed on an external retainer for aligning to the former optical element on the supporting seat. A coarse control button is firstly used to coarsely adjust the position of the former optical element to approximately align to the later optical element. Then a fine-adjusting button is used to fine adjust the position therebetween so as to well align the two optical elements to a desire level for further operation, such as connecting the two elements.

6 Claims, 4 Drawing Sheets

OPTICAL MOVER WITH FUNCTIONS OF NANOMETER FINE ADJUSTMENT AND MICROMETER COARSE ADJUSTMENT

FIELD OF THE INVENTION

The present invention relates to alignment of optical elements; and in particular to an optical mover with functions of nanometer fine adjustment and micrometer coarse adjustment.

BACKGROUND OF THE INVENTION

With the growth in the optical communication and many other optical applications, optical elements alignment has become the focus of much industrial attention. This is a key production process because the connection efficiency of the optical elements greatly influences the overall production rates and the quality of the connected optical elements for the products used in optical communication.

Metallic wire connection is relatively easy because an electric current will flow as long as the two wires are in contact. The connection between two optical elements, such as connections of an optical fiber to a photo diode, or connection of one optical fiber to one optical waveguide, it needs to align two optical elements. However, requires much greater precision, in the order of sub-micro-meters. Therefore, experienced technicians are needed for optical elements alignment, but as such technicians are limited in supply, this causes a bottleneck to the mass production of components for optical communications.

Automatic alignment system can shift slightly the light axes of two optical elements, such as optical fibers to minimize transmission loss. Once alignment is complete, the light axes are fixed by laser processing or a setting resin.

For precisely aligning two optical elements, the applicant of the present invention discloses an invention "Nanomover For Optical Element Alignment Without Driving Electrically", which is allowed with a patent in U.S. with a U.S. Pat. No. 7,817,890 B2 (which also allows with patent rights in China, Taiwan, Japan and Germany). In this patent, the applicant disclosed a device for aligning two optical elements by using a weak spring and a strong spring, which is achieved mechanically without any electric elements. However, in case the two elements separate with a larger distance over a largest traveling length of the nanomover, the nanomover of this prior art is not suitable for the alignment operation.

There are many kinds of micromovers in the prior arts for coarsely adjusting the optical elements in alignment operation so as to drive them to a desire position. However, each traveling step of the micromover is too large to match the requirement in optical alignment.

Therefore, the inventor of the present invention tries to combine the advantages of the nanomover in U.S. Pat. No. 7,817,890 B2 and the prior art micromover so as to have a precise adjustment in optical alignment. Furthermore, the height, volume, weight and cost of the whole structure are improved.

SUMMARY OF THE INVENTION

The present invention discloses an optical mover with functions of nanometer fine adjustment and micrometer coarse adjustment, in that the present invention is mainly used to align two optical elements for connecting the twos, such as two optical fibers, one optical fiber to a photo diodes, or one optical fiber and one optical waveguide. In using, one optical element is placed upon the supporting seat for fine position adjustment, and another optical element is fixed on an external retainer for aligning to the former optical element on the supporting seat. The coarse control button is firstly used to coarsely adjust the position of the former optical element to approximately align to the later optical element. Then the fine-adjusting button is used to fine-adjust the position therebetween so as to well align the two optical elements to a desire level for further operation, such as connecting the two elements.

To achieve above object, the present invention provides an optical mover with functions of nanometer fine adjustment and micrometer coarse adjustment, comprising a fine-adjusting button including a fine screwing ring, a first fixing rod, and a first middle shaft; the fine screwing ring can screwedly move along the first fixing rod to push the first middle shaft to move axially; the fine-adjusting button using a screwing operation to increase precisions in axial movement; a supporting seat having an inner flange at a bottom side thereof; a lower side of the supporting seat being formed as a hollow space; the inner flange dividing the hollow space into a front channel and a rear channel; a fine moving shaft having a front end resisting against the middle shaft; the middle shaft could drive the fine moving shaft; the fine moving shaft passing through the front channel and the rear channel; a weak spring located within the front channel; one end of the weak spring being retained to a protrusion at one end of the fine moving shaft and winding around the fine moving shaft; movement of the fine moving shaft will compress or expand the weak spring; a hollow push cylinder being installed in the front channel below the supporting seat; another end of the weak spring resisting against one end of the hollow push cylinder and another end of the hollow push cylinder resisting against the inner flange of the supporting seat; the compression or releasing of the weak spring will cause the hollow push cylinder to move forwards or backwards; the fine moving shaft being movable with respect to the hollow push cylinder and the inner flange of the supporting seat so that the movement of the fine moving shaft will not directly move the hollow push cylinder and the inner flange of the supporting seat; in operation, the fine moving shaft moves so as to compress or extend the weak spring; then the weak spring will push the hollow push cylinder to move forwards or backwards; since one end of the hollow push cylinder resists against the inner flange of the supporting seat, the movement of the hollow push cylinder will drive the supporting seat to move; a strong spring being installed in the rear channel below the supporting seat; one end of the strong spring resisting against the inner flange of the supporting seat and another end of the strong spring being retained to a fixed wall; wherein an elastic coefficient of the strong spring is very larger than that of the weak spring a coarse control button including a coarse screwing ring, a second fixing rod and a second middle shaft; the coarse screwing ring moving along the second fixing rod to push the second middle shaft to move axially; the coarse screwing ring serving to increase the precision in control of the mover; the moving track being converted from rotation to straight line; thus the movement being controlled by a level of micrometers; and a base being formed by a seat and an upper casing covering upon the base; the base having one end resisting against the second middle shaft of the coarse control button; when the coarse control button screwedly moves forwards or backwards, the base moves therewith; a lower inner side of the upper casing being a hollow space; the upper casing having an upper opening, a front opening and a rear opening; the supporting seat being located within the upper opening of the upper casing; a front side and a rear side of the supporting seat being flexible connected to edges of the upper opening so that the supporting seat being movable slightly with respect to an upper surface of the base; therefore, the supporting seat moving within nanometer level due to a push from the fine moving shaft and the hollow push cylinder, but the base being motionless; an upper surface of the supporting seat exposing out from the upper opening of the hollow space so that in fine adjustment, the supporting seat moves within the upper opening along a moving direction of the fine moving shaft; a contact point between the fine moving shaft and the first middle shaft of the fine-adjusting button being near the front opening of the upper casing.

DESCRIPTION OF THE INVENTION

Figure 1A:
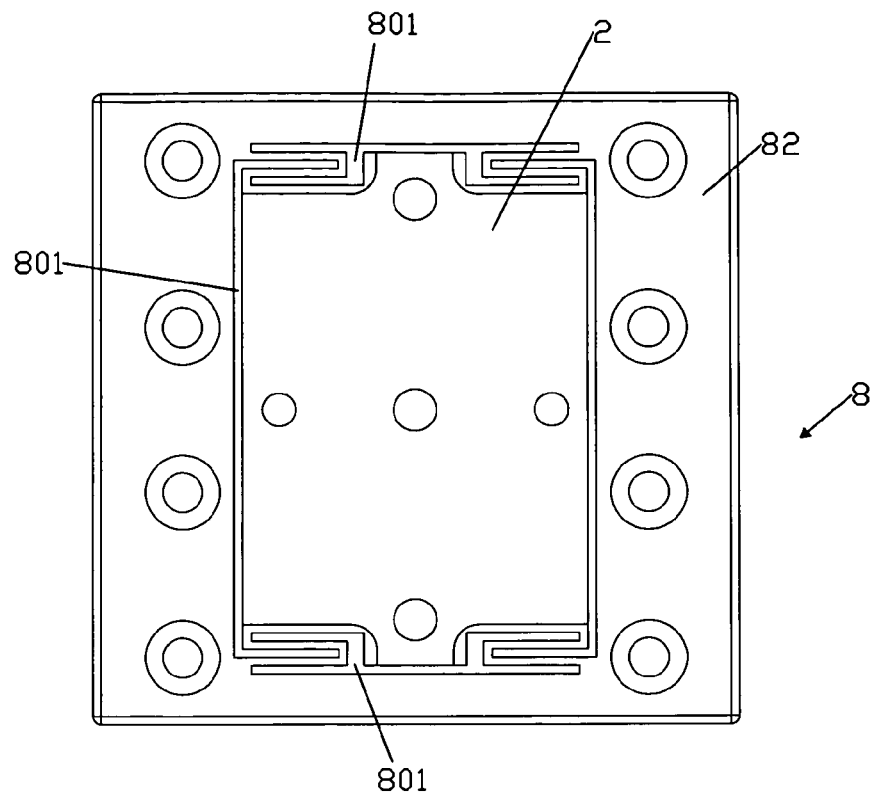
FIG. 1A shows an upper view of the present invention.
Figure 1B:
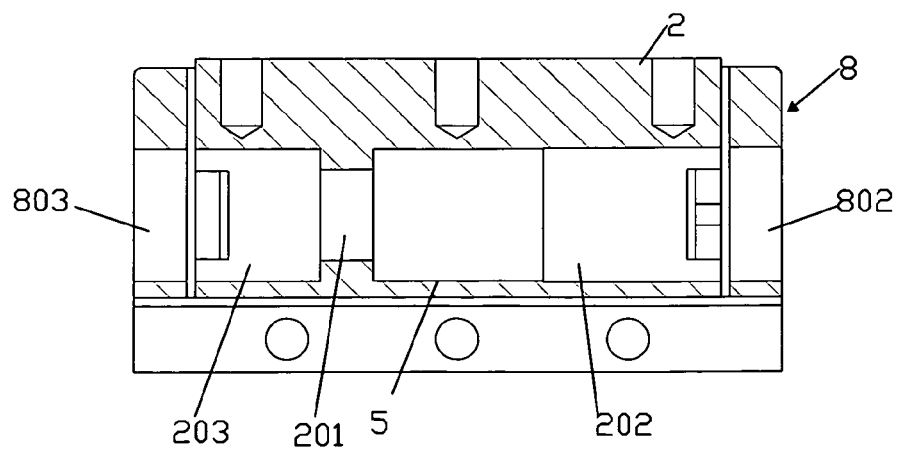
FIG. 1B shows a lateral cross sectional view of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1A, 1B, 2A, 2B, 2C, 3 and 4, the optical mover capable for micrometer and nanometer adjustment comprises the following elements.

A fine-adjusting button 1 includes a fine screwing ring 11, a first fixing rod 12, and a first middle shaft 13. The fine screwing ring 11 can screwedly move along the first fixing rod 12 to push the first middle shaft 13 to move axially. The fine-adjusting button 1 uses a screwing operation to increase the precision of axial movement so as to achieve the object of fine adjustment.

A supporting seat 2 has an inner flange 201 at a bottom side thereof. A lower side of the supporting seat 2 is formed as a hollow space. The inner flange 201 divides the hollow space as a front channel 202 and a rear channel 203.

A fine moving shaft 3 has a front end resisting against the middle shaft 13. The middle shaft 13 could drive the fine moving shaft 3. The fine moving shaft 3 passes through the front channel 202 and the rear channel 203.

A weak spring 4 is located within the front channel 202. One end of the weak spring 4 is retained to a protrusion 31 at one end of the fine moving shaft 3 and winds around the fine moving shaft 3. Movement of the fine moving shaft 3 will compress or expand the weak spring 4.

A hollow push cylinder 5 is installed in the front channel 202 below the supporting seat 2. Another end of the weak spring 4 resists against one end of the hollow push cylinder 5 and another end of the hollow push cylinder 5 resists against the inner flange 201 of the supporting seat 2. The compression or releasing of the weak spring 4 will cause the hollow push cylinder 5 to move forwards or backwards.

The fine moving shaft 3 is movable with respect to the hollow push cylinder 5 and the inner flange 201 of the supporting seat 2 so that the movement of the fine moving shaft 3 will not directly move the hollow push cylinder 5 and the inner flange 201 of the supporting seat 2.

In operation, the fine moving shaft 3 moves so as to compress or extend the weak spring 4. Then the weak spring 4 will push the hollow push cylinder 5 to move forwards or backwards. Since one end of the hollow push cylinder 5 resists against the inner flange 201 of the supporting seat 2, the movement of the hollow push cylinder 5 will drive the supporting seat 2 to move.

A strong spring 6 is installed in the rear channel 203 below the supporting seat 2. One end of the strong spring 6 resists against the inner flange 201 of the supporting seat 2 and another end of the strong spring 6 is retained to a fixed wall of the rear stop 811.

An elastic coefficient of the strong spring 6 is very larger than that of the weak spring 4, for example, 100 times. When the weak spring 4 is compressed through a length of 100 units, the strong spring 6 only compresses through a length of 1 unit. As a result, the hollow push cylinder 5 and the inner flange 201 (also including the supporting seat 2) are also compresses through 1 unit as compression length of the strong spring 6.

In one practical example, when the weak spring 4 is compressed through a length of 10 micrometers, the strong spring 6 only compresses through a length of 100 nanometers. The compression ratio therebetween is 100:1. Since one end of the strong spring 6 resists against the supporting seat 2, the supporting seat 2 only moves through 100 nanometers.

Furthermore, in the present invention, a coarse adjustment (micrometer level) optical mover includes the following elements.

A coarse control button 7 includes a coarse screwing ring 71, a second fixing rod 72 and a second middle shaft 73. The coarse screwing ring 71 moves along the second fixing rod 72 to push the second middle shaft 73 to move axially. The coarse screwing ring 71 serves to increase the precision in control of the mover. The moving track is reduced from rotation to straight line. Thus the movement is controlled by a level of micrometers.

A base 8 has one end resisting against the second middle shaft 73 of the coarse control button 7. When the coarse control button 7 screwedly moves forwards or backwards, the base 8 moves therewith. A lower side of the base 8 is a hollow space. The base 8 has an upper opening 801, a front opening 803 and a rear opening 803. A contact between the fine moving shaft 3 and the first middle shaft 13 of the fine-adjusting button 1 is near the front opening 803. A spring room 800 is formed below the supporting seat 2 and fine moving shaft 3.

Figure 2A:
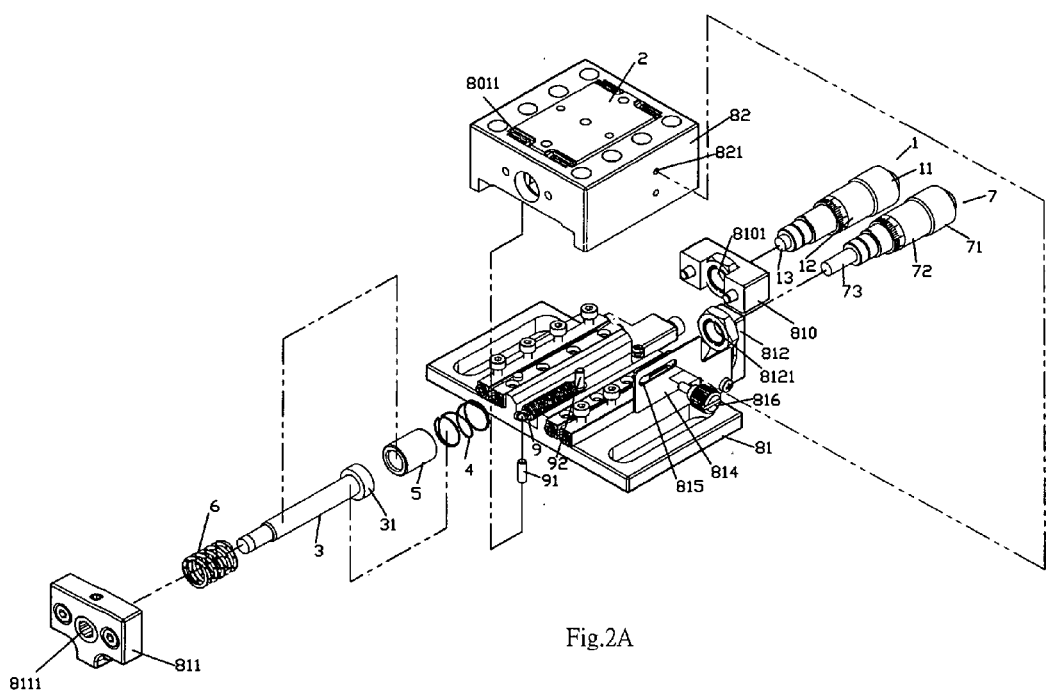
FIG. 2A is an exploded view of the present invention.
Figure 2B:
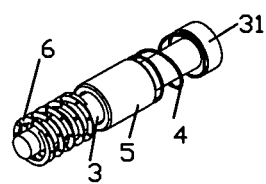
FIG. 2B is a partial view of the present invention.
Figure 2C:
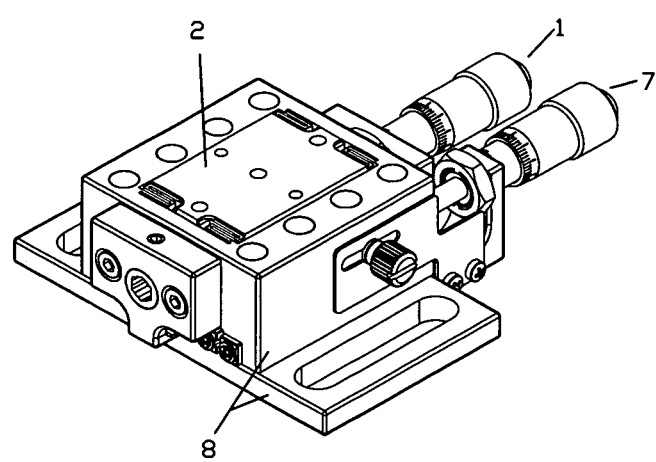
FIG. 2C shows an assembly view of the present invention.
Figure 3:
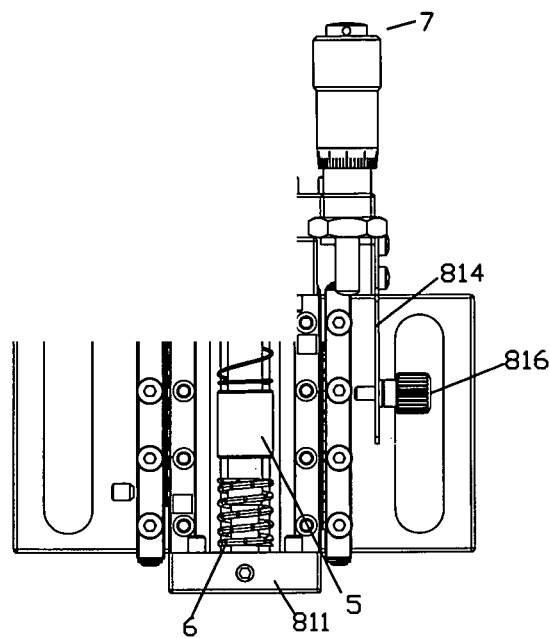
FIG. 3 is an upper cross sectional view of the present invention.
Figure 4:
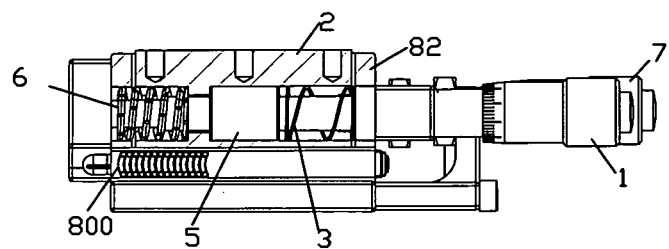
FIG. 4 is another lateral cross sectional view of the present invention.

The supporting seat 2 is in the upper opening 801 of the base 8. A front side and a rear side of the supporting seat 2 are flexible connected to edges of the upper opening 801 so that the supporting seat 2 is movable slightly with respect to an upper surface of the base 8. Therefore, the supporting seat 2 is moved within nanometer level due to a push from the fine moving shaft 3 and the hollow push cylinder 5, but the base 8 is motionless. Preferably, as illustrated in FIG. 2A, the front side and rear side of the supporting seat 2 near edges of the upper opening 801 are formed with slender strips (to form as a flexure) which connects between the supporting seat 2 and the edges of the base 8, while other portions are hollowed. Thus in operation, the supporting seat 2 is movable within ranges of nanometers. However, the moving length of the supporting seat 2 is smaller than the line width of each strip.

Furthermore, an upper surface of the supporting seat 2 exposes out of the upper opening 801.

As illustrated in the drawings, the base 8 is formed with a seat 81 and an upper casing 82 which are locked by screws so as to form as a rigid body.

The upper casing 82 is a hollow structure. An upper side and a lower side thereof have respective openings. The opening at the upper side is the upper opening 801. A front opening 802 and a rear opening 803 are located at a front side and a rear side of the upper casing 82.

A front side and a rear side of the seat 81 are extended with respective front stop 810 and rear stop 811. The front stop 810 has a front through hole 8101 corresponding to the front opening 803 of the upper casing 82; and the rear stop 811 has a rear through hole 8111 corresponding to the rear opening 803 of the upper casing 82. One side of the front stop 810 of the seat 81 extends with a retaining plate 812. The plate 812 has a penetrating hole 8121 for receiving the coarse control button 7. When the coarse control button 7 passes through the penetrating hole 8121, the front end thereof will resist against the front wall of the upper casing 82. Therefore, when the coarse control button 7 rotates, the upper casing 82 will be driven to move forwards or backwards.

A left side of the seat 81 is locked with a lateral plate 814. The lateral plate 814 is formed with a long slot 1815. A left side of the upper casing 82 is formed with a screw hole 821 at a position corresponding to that of the long slot 815. In assembly, a stud 816 passes through the long slot 815 and then the stud 816 screws forwards to the screw hole 821. Therefore, it is fixed to the screw hole 821. Since a longitudinal axis of the long slot 815 is very larger than the diameter of the stud 816, the stud 816 is movable along the longitudinal axis of the long slot 815. That is, the upper casing 82 is movable with respect to the seat 81. By the rotation operation of the coarse control button 7 to push the upper casing 82 to move forwards and backwards along the seat 81, an object on the supporting seat 2 is coarsely adjusted to a desired position.

Two sets of slide ways are installed between the seat 81 and the upper casing 82, each track is installed with rolling ball or bearing (not shown). One side of each slide way is locked to the seat 81 and another side thereof is locked to the upper casing 82 so as to confine a movement between the seat 81 and the upper casing 82 is only performed along the tracks.

A restoring spring 9 has one end fixed to a retaining shaft 91 of the upper casing 82 and another end fixed to another retaining shaft 92 of the seat 81 so that in coarse operation, it can provide a restoring force to the upper casing 82.

Assembly of the present invention will be described herein, the upper casing 82 is engaged to the seat 81. One side of each slide way is locked to the seat 81 and another side thereof is locked to the upper casing 82 so as to confine the movement between the seat 81 and the upper casing 82 is only performed along the tracks.

The front opening 802 of the upper casing 82 is aligned to the through hole of the seat 81 and the rear opening 803 of the upper casing 82 is aligned to the rear through hole of the seat 81. Then the fine moving shaft 3 passes through the front opening 802 and rear opening 803 of the upper casing 82 and the front through hole 8101 and rear through hole 8111 of the seat 81 so as to penetrate through the base 8. When the upper casing is installed to the seat, the supporting seat 2 enters into the upper opening 801 of the upper casing 82 so as to be located within the upper opening; and the lower side of the supporting seat 2 is formed as the hollow space. Then the stud 816 passes through the long slot 815 and then the stud 816 screws forwards to the screw hole 821. Therefore, it is fixed to the screw hole 821. Since the longitudinal axis of the long slot 815 is very larger than the diameter of the stud 816, the stud 816 is movable along the longitudinal axis of the long slot 815. That is, the upper casing 82 is movable with respect to the seat 81. The fine moving shaft 3, the weak spring 4, the strong spring 6 and the hollow push cylinder 5 are installed into the hollow space below the supporting seat 2. When the coarse control button 7 passes through the penetrating hole 8121, the front end thereof will resist against the front wall of the upper casing 82. Therefore, when the coarse control button 7 rotates, the upper casing 82 will be driven to move forwards or backwards.

In operation, the coarse control button 7 is adjusted to move along the upper casing 82 to a desired location. Then the fine-adjusting button 1 is adjusted. The fine screwing ring 11 screwedly moves along the first fixing rod 12 to push the first middle shaft 13 to move axially. The fine-adjusting button 1 uses a screwing operation to increase the precision in axial movement so as to achieve the object of fine adjustment. The middle shaft 13 drives the fine moving shaft 3. One end of the weak spring 4 is retained to the protrusion 31 at one end of the fine moving shaft 3 and winds around the fine moving shaft 3. Movement of the fine moving shaft 3 will compress or expand the weak spring 4. Another end of the weak spring 4 resists against one end of the hollow push cylinder 5 and another end of the hollow push cylinder 5 resists against the inner flange 201 of the supporting seat 2. The compression or releasing of the weak spring 4 will cause the hollow push cylinder 5 to move forwards or backwards. The fine moving shaft 3 is movable with respect to the hollow push cylinder 5 and the inner flange 201 of the supporting seat. Movement of the fine moving shaft 3 will drive the hollow push cylinder 5 to cause the supporting seat 2 to move a desired position. Since the elastic coefficient of the strong spring 6 is very larger than that of the weak spring 4, the strong spring 6 will resist against the supporting seat 2 so that the whole travel length of the supporting seat 2 is very smaller than the compression length of the weak spring 4. Each step of the movement is only several nanometers. As a result, the positions of the optical elements to be aligned are fine-adjusted.

The present invention is mainly used to align two optical elements for connecting the twos, such as two optical fibers, two photo diodes, and two light emitting diodes, or one optical fiber and one optical waveguide. In using, one optical element is placed upon the supporting seat for fine position adjustment, and another optical element is fixed on an external retainer for aligning to the former optical element on the supporting seat. The coarse control button is firstly used to coarsely adjust the position of the former optical element to approximately align to the later optical element. Then the fine-adjusting button is used to fine adjust the position therebetween so as to well align the two optical elements to a desire level for further operation, such as connecting the two elements.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An optical mover with functions of nanometer fine adjustment and micrometer coarse adjustment, comprising:
a fine-adjusting button including a fine screwing ring, a first fixing rod, and a first middle shaft; the fine screwing ring can screwedly move along the first fixing rod to push the first middle shaft to move axially; the fine-adjusting button using a screwing operation to increase precisions in axial movement;

a supporting seat having an inner flange at a bottom side thereof; a lower side of the supporting seat being formed as a hollow space; the inner flange dividing the hollow space into a front channel and a rear channel;

a fine moving shaft having a front end resisting against the first middle shaft; the first middle shaft being capable of driving the fine moving shaft; the fine moving shaft passing through the front channel and the rear channel;

a weak spring located within the front channel; one end of the weak spring being retained to a protrusion at one end of the fine moving shaft and winding around the fine moving shaft; in that, movement of the fine moving shaft compresses or expands the weak spring;

a hollow push cylinder being installed in the front channel below the supporting seat; another end of the weak spring resisting against one end of the hollow push cylinder and another end of the hollow push cylinder resisting against the inner flange of the supporting seat; the compression or releasing of the weak spring will cause the hollow push cylinder to move forwards or backwards;

the fine moving shaft being movable with respect to the hollow push cylinder and the inner flange of the supporting seat so that the movement of the fine moving shaft will not directly move the hollow push cylinder and the inner flange of the supporting seat;

in operation, the fine moving shaft moves so as to compress or extend the weak spring such that the weak spring will push the hollow push cylinder to move forwards or backwards, the hollow push cylinder rests against the inner flange of the supporting seat, such that the movement of the hollow push cylinder will drive the supporting seat to move;

a strong spring being installed in the rear channel below the supporting seat; one end of the strong spring resisting against the inner flange of the supporting seat and another end of the strong spring being retained to a fixed wall of a rear stop; wherein an elastic coefficient of the strong spring is much larger than that of the weak spring;

a coarse control button including a coarse screwing ring, a second fixing rod and a second middle shaft; the coarse screwing ring moving along the second fixing rod to push the second middle shaft to move axially; the coarse screwing ring serving to increase the precision in control of the optical mover; the moving track being converted from a rotation to straight line such that the movement being controlled by a level of micrometers; and a base being formed by a seat and an upper casing covering upon the base; the base having one end resisting against the second middle shaft of the coarse control button; when the coarse control button screwedly moves forwards or backwards, the base moves therewith; a lower inner side of the upper casing being a hollow space; the upper casing having an upper opening, a front opening and a rear opening; the supporting seat being located within the upper opening of the upper casing; a front side and a rear side of the supporting seat being flexible connected to edges of the upper opening so that the supporting seat being movable slightly with respect to an upper surface of the base such that the supporting seat moving within nanometer level due to a push from the fine moving shaft and the hollow push cylinder, but the base being motionless; an upper surface of the supporting seat exposing out from the upper opening of the hollow space so that in fine adjustment, the supporting seat moves within the upper opening along a moving direction of the fine moving shaft; a contact point between the fine moving shaft and the first middle shaft of the fine-adjusting button being near the front opening of the upper casing.

2. The optical mover with functions of nanometer fine adjustment and micrometer coarse adjustment as claimed in claim 1, wherein the front side and the rear side of the supporting seat being flexibly connected to edges of the upper opening by a plurality of flexible slender strips, spaces being formed between the slender strips; in fine adjustment, the supporting seat moving through a step of several nanometers and within the upper opening along the moving direction of the fine moving shaft; and the overall traveling length is smaller than a width of the strip.

3. The optical mover with functions of nanometer fine adjustment and micrometer coarse adjustment as claimed in claim 1, wherein the upper casing is movably retained to the seat by screws; the upper casing is a hollow structure; an upper side and a lower side thereof have respective openings; the opening at the upper side is the upper opening of the upper casing; a front opening and a rear opening are located at a front side and a rear side of the upper casing, respectively; and a front side and a rear side of the seat are extended respectively with a front stop and a rear stop; the front stop has a front through hole corresponding to the front opening of the upper casing; and the rear stop has a rear through hole corresponding to the rear opening of the upper casing; one side of the front stop of the seat extends with a retaining plate; the retaining plate has a penetrating hole for receiving the coarse control button; the coarse control button passes through the penetrating hole such that the front end thereof resists against the front wall of the upper casing, and such that when the coarse control button rotates the upper casing moves forwards or backwards.

4. The optical mover with functions of nanometer fine adjustment and micrometer coarse adjustment as claimed in claim 3, wherein a left side of the seat is locked with a lateral plate; the lateral plate is formed with a long slot; a left side of the upper casing is formed with a screw hole at a position corresponding to that of the long slot; in assembly, a stud passes through the long slot and then the stud screws forwards to the screw hole such that it is fixed to the screw hole; a longitudinal axis of the long slot is much larger than a diameter of the stud; the stud is movable along the longitudinal axis of the long slot such that the upper casing is movable with respect to the seat; by a rotation operation of the coarse control button to push the upper casing to move forwards and backwards along the seat such that an object on the supporting seat is coarsely adjusted to a desired position.

5. The optical mover with functions of nanometer fine adjustment and micrometer coarse adjustment as claimed in claim 3, wherein a restoring spring has one end fixed to a retaining shaft of the upper casing and another end fixed to another retaining shaft of the seat so that in coarse operation, it provides a restoring force to the upper casing.

6. The optical mover with functions of nanometer fine adjustment and micrometer coarse adjustment as claimed in claim 4, wherein during assembling, the upper casing is engaged to the seat; one side of each slide way is locked to the seat and another side thereof is locked to the upper casing such that a movement between the seat and the upper casing is confined to be only performed along the tracks; the front opening of the upper casing is aligned to the through hole of the seat and the rear opening of the upper casing is aligned to the rear through hole of the seat; then the fine moving shaft passes through the front opening and rear opening of the upper casing and the front through hole and rear through hole of the seat so as to penetrate through the base; when the upper casing is installed to the seat, the supporting seat enters into the upper opening of the upper casing so as to be located within the upper opening; and the lower side of the supporting seat is formed as the hollow space; then the stud passes through the long slot and then the stud screws forwards to the screw hole such that it is fixed to the screw hole; the longitudinal axis of the long slot is much larger than the diameter of the stud such that the stud is movable along the longitudinal axis of the long slot and such that the upper casing is movable with respect to the seat; the fine moving shaft, the weak spring, the strong spring and the hollow push cylinder are installed into the hollow space below the supporting seat; the coarse control button passes through the penetrating hole such that the front end thereof resists against the front wall of the upper casing and such that rotation of the coarse control button drives the upper casing to move forwards or backwards.

\* \* \* \* \*